US012607919B2

(12) United States Patent
Li et al.

(10) Patent No.: US 12,607,919 B2
(45) Date of Patent: Apr. 21, 2026

(54) LASER LIGHT SYSTEM AND PROJECTION EQUIPMENT

(71) Applicant: HISENSE LASER DISPLAY CO., LTD., Shandong (CN)

(72) Inventors: Wei Li, Shandong (CN); Xiaoqiang Gu, Shandong (CN)

(73) Assignee: Hisense Laser Display Co., Ltd., Qingdao (CN)

( * ) Notice: Subject to any disclaimer, the term of this patent is extended or adjusted under 35 U.S.C. 154(b) by 376 days.

(21) Appl. No.: 18/319,740

(22) Filed: May 18, 2023

(65) Prior Publication Data

US 2023/0288793 A1 Sep. 14, 2023

Related U.S. Application Data

(63) Continuation of application No. PCT/CN2021/103533, filed on Jun. 30, 2021.

(30) Foreign Application Priority Data

Mar. 11, 2021 (CN) .......................... 202110266343.2

(51) Int. Cl.
*G03B 21/20* (2006.01)
*G03B 33/12* (2006.01)

(52) U.S. Cl.
CPC ........... *G03B 21/204* (2013.01); *G03B 33/12* (2013.01)

(58) Field of Classification Search
None
See application file for complete search history.

(56) References Cited

U.S. PATENT DOCUMENTS

2013/0322056 A1 12/2013 Konuma et al.
2015/0153636 A1 6/2015 Hartwig
(Continued)

FOREIGN PATENT DOCUMENTS

CN 103453448 A 12/2013
CN 104020632 A * 9/2014
(Continued)

OTHER PUBLICATIONS

International search report of PCT application No. PCT/CN2021/103533 issued on Nov. 25, 2021.

*Primary Examiner* — Bao-Luan Q Le
*Assistant Examiner* — Danell L Owens
(74) *Attorney, Agent, or Firm* — Knobbe, Martens, Olson & Bear, LLP

(57) ABSTRACT

Provided is a laser optical path system, including: a laser, a beam combiner, a loop guide assembly, and a fluorescence assembly; wherein a light beam emitted by the laser includes a first light beam passing through the first region and irradiating to the fluorescence assembly, wherein the fluorescence assembly generates a fluorescence upon excitation of the first light beam, and the fluorescence is reflected to the second region by the fluorescence assembly, and is further reflected into a direction towards a light outlet by the second region; and the light beam emitted by the laser further includes a second light beam reflected to the loop guide assembly by the first region, wherein the second light beam is further reflected to the first region by the loop guide assembly, passes through the first region, and irradiates to the direction towards the light outlet in synchronization with the fluorescence.

17 Claims, 7 Drawing Sheets

(56)                    References Cited

U.S. PATENT DOCUMENTS

| | | | |
|---|---|---|---|
| 2016/0077419 A1 | 3/2016 | Sheng | |
| 2018/0157050 A1 | 6/2018 | Liao et al. | |
| 2018/0246400 A1 | 8/2018 | Takagi et al. | |
| 2020/0019049 A1* | 1/2020 | Liu | ........................ G02B 27/10 |

FOREIGN PATENT DOCUMENTS

| | | | | |
|---|---|---|---|---|
| CN | 104698729 A | 6/2015 | | |
| CN | 107505807 A | 12/2017 | | |
| CN | 108153089 A | 6/2018 | | |
| JP | 2018194819 A | 12/2018 | | |
| WO | WO-2018133501 A1 * | 7/2018 | ........... | H04N 9/3126 |

* cited by examiner

12

141

142

142

1421

1313

13132

S2

13131

13133

LASER LIGHT SYSTEM AND PROJECTION EQUIPMENT

CROSS-REFERENCE TO RELATED APPLICATIONS

This application is a continuation application of international application No. PCT/CN2021/103533, filed on Jun. 30, 2021, which claims priority to Chinese Patent Application No. 202110266343.2, filed on Mar. 11, 2021, and entitled "LASER LIGHT SOURCE SYSTEM AND PROJECTION EQUIPMENT," the contents of which are herein incorporated by reference in their entireties.

TECHNICAL FIELD

The present disclosure relates to the field of projection display technologies, and in particular, relates to a laser light system and projection equipment.

BACKGROUND OF THE INVENTION

At present, a light source of projection equipment is mainly classified into three types, that is, a traditional bulb light source, an LED light source, and a laser light source. The laser light source, as the light source of the projection equipment, has the advantages of high luminance, vibrant colors, low energy consumption, and long service life, which allows the projection equipment to have characteristics of high contrast and clear imaging.

SUMMARY OF THE INVENTION

According to some embodiments of the present disclosure, a laser light system is provided. The laser light system includes: a laser, a beam combiner, a loop guide assembly, and a fluorescence assembly; wherein the beam combiner includes a first region and a second region, and an angle between a light-emitting direction of the laser and a lens surface of the first region is an acute angle;

a light beam emitted by the laser includes a first light beam passing through the first region and irradiating to the fluorescence assembly, wherein the fluorescence assembly generates a fluorescence upon excitation of the first light beam, and the fluorescence is reflected to the second region by the fluorescence assembly and is further reflected into a direction towards a light outlet by the second region; and the light beam emitted by the laser further includes a second light beam reflected to the loop guide assembly by the first region, wherein the second light beam is further reflected to the first region by the loop guide assembly, passes through the first region, and irradiates to the direction towards the light outlet in synchronization with the fluorescence;

wherein the fluorescence and the second light beam converge at the light outlet to form white light.

According to some embodiments of the present disclosure, projection equipment is provided. The projection equipment includes at least two light valves and the laser light system as described above.

BRIEF DESCRIPTION OF DRAWINGS

For clearer descriptions of the technical solutions in the embodiments of the present disclosure, the following briefly introduces the accompanying drawings to be required in the descriptions of the embodiments. Apparently, the accompanying drawings in the following description show merely some embodiments of the present disclosure, and persons of ordinary skills in the art may still derive other drawings from these accompanying drawings without creative efforts.

DETAILED DESCRIPTION

Figure 1:
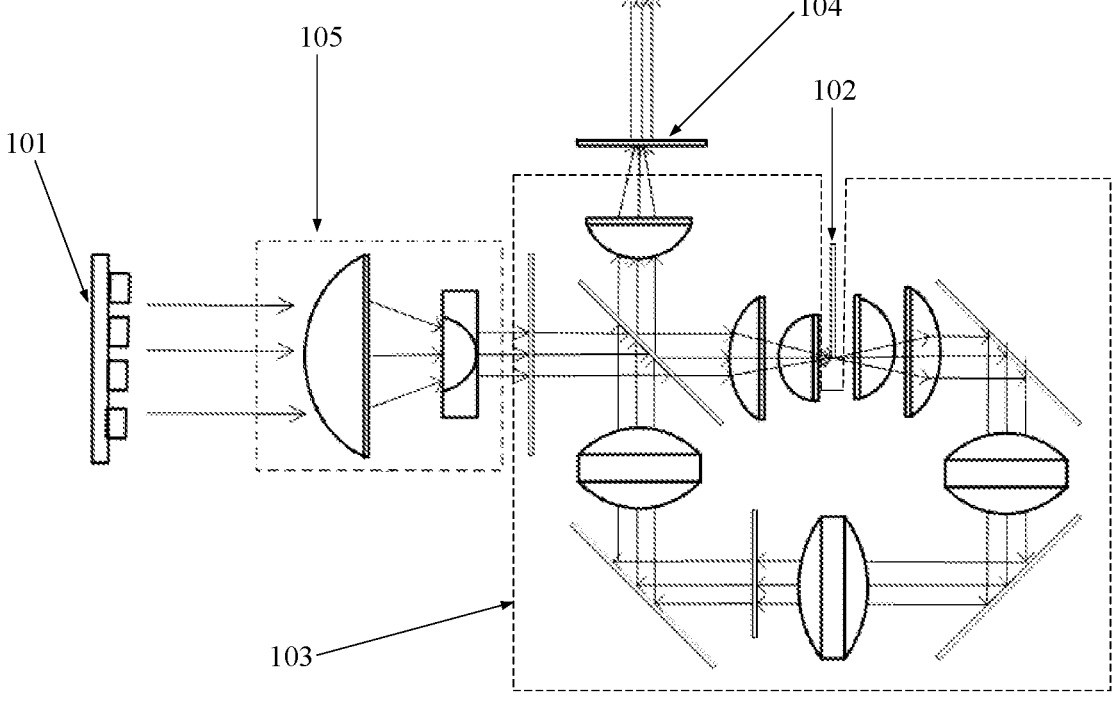
FIG. 1 is a schematic structural diagram of a laser light system in the related art.

The present disclosure is described in further detail with reference to the accompanying drawings, to clearly present the objects, technical solutions, and advantages of the present disclosure.

It should be noted that unless otherwise require by the context, throughout the specification and claims, the terms "comprise" and "include" are construed to be open and inclusive, that is, "includes, but is not limited to." In the description of the specification, the terms "an embodiment," "some embodiments," "an exemplary embodiment," "example," "particular example," or "some examples" are intended to indicate that a particular feature, structure, material, or characteristic related to the embodiment or example is included in at least one embodiment or example of the present disclosure. The schematic representation of the above terms does not necessarily refer to the same embodiment or example. In addition, the particular feature, structure, material, or characteristic may be included in any one or more embodiments or examples in any appropriate manner.

The terms "first" and "second" are only used for descriptive purposes, and cannot be understood as indicating or implying relative importance or implicitly specifying the number of technical features indicated. Thus, features limited by the terms "first" and "second" may explicitly or implicitly include one or more such features. In the description of embodiments of the present disclosure, the term "a plurality of" refers to two or more, unless expressly defined otherwise.

In a laser light system, fluorescent materials are excited by the laser to generate fluorescences of different colors, and the generated fluorescences are used as a light source for a projection display system. Compared with a projection display light source using a traditional bulb light source, the light source of the fluorescences excited by the laser has the advantages of high luminance, vibrant colors, low energy consumption, and long service life, which allows the projection equipment to have characteristics of high contrast and clear imaging.

The fluorescence is light emitted by a substance after absorbing light or other electromagnetic radiation. That is, when a room-temperature substance is irradiated by incident light of a certain wavelength (typically ultraviolet or X-rays), it enters an excited state after absorbing the light energy, and immediately de-excites and emits emergent light, of which a wavelength is longer than the wavelength of the incident light (typically the wavelength of the emergent light is within the visible band); once the incident light is stopped from irradiating to fluorescence substances, the luminescence of the fluorescence substance also disappears immediately. Emergent light with such nature is referred to as fluorescence. In general, the stronger the incident light, the greater the number of molecules excited to the excited state on the fluorescent material, and thus the intensity of the generated fluorescence is stronger.

FIG. 1 is a schematic structural diagram of a laser light system in the related art. As illustrated in FIG. 1, the laser light system includes a monochromatic laser 101, a fluorescence assembly 102, a loop guide assembly 103, an output assembly 104, and a convergence assembly 105. The fluorescence assembly 102 includes a plurality of fluorescence regions configured to excite fluorescences of different colors. The loop guide assembly 103 is configured to provide light paths for the fluorescence of different colors, such that the fluorescences of different colors are time-sharing projected to the output assembly and then output from the laser light system.

The loop guide assembly 103 in the laser light system described above is configured to provide the light paths for the fluorescences of different colors. Therefore, it is apparent that the light paths have a complex structure and a large size, which leads to a complex structure and a large size of laser light system, and the luminance of the projected image is typically low.

Some embodiments of the present disclosure provide a laser light system.

Figure 2:
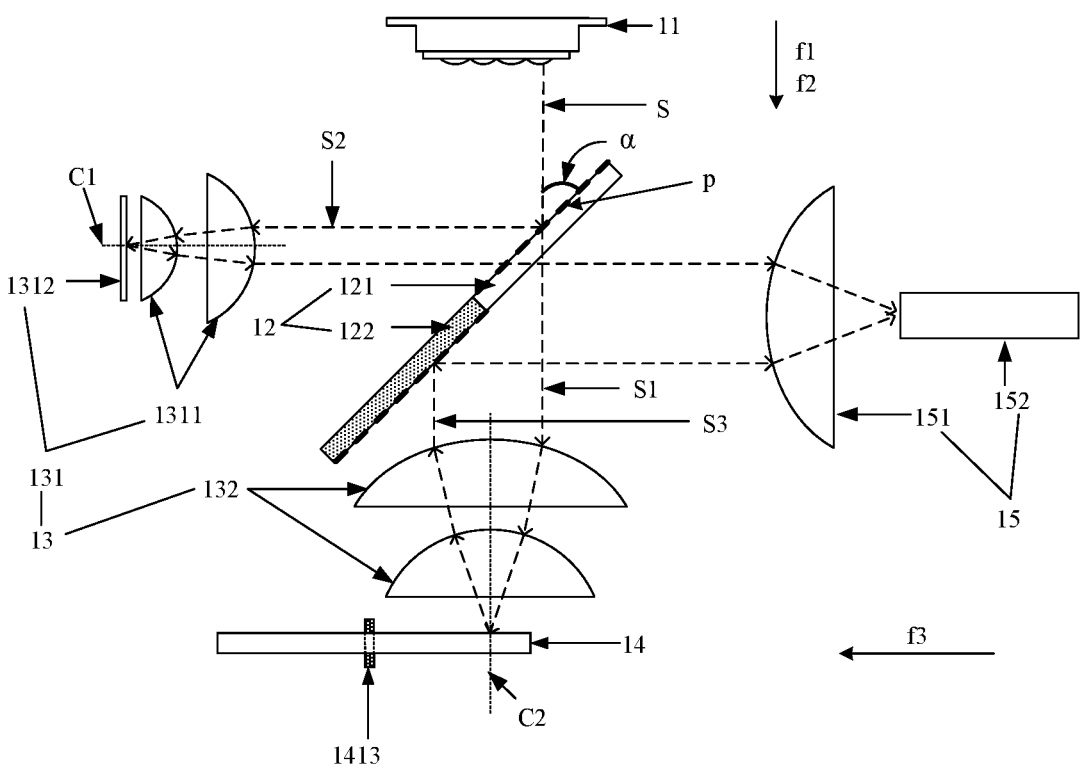
FIG. 2 is a schematic structural diagram of a laser light system according to some embodiments of the present disclosure.

FIG. 2 is a schematic structural diagram of a laser light system according to some embodiments of the present disclosure. As illustrated in FIG. 2, the laser light system includes a laser 11, a beam combiner 12, a loop guide assembly 13, a fluorescence assembly 14, and a light outlet 15. The light outlet 15 is configured to output a light beam to a plurality of light valves.

The beam combiner 12 includes a first region 121 and a second region 122, and an angle between a light-emitting direction f1 of the laser 11 and a lens surface of the first region 121 is an acute angle.

Exemplarily, the angle α between the light-emitting direction f1 of the laser 11 and the lens surface of the first region 121 is 45 degrees.

The loop guide assembly 13 includes a reflector group 131.

A light beam S emitted by the laser 11 includes a first light beam S1 that passes through the first region 121 and irradiates to the fluorescence assembly 14. The fluorescence assembly 14 generates fluorescence S3 upon excitation of the first light beam S1, and the fluorescence S3 is reflected to the second region 122 by the fluorescence assembly 14, and is further reflected to the light outlet 15. The light beam S emitted by the laser 11 further includes a second light beam S1 that is reflected to the reflector group 131 by the first region 121. The second light beam S2 is further reflected to the first region 121 by the reflector group 131, and the reflected second light beam S2 passes through the first region 121 and irradiates to the light outlet 15 in synchronization with the fluorescence S3.

The laser 11 is monochromatic, and the fluorescence assembly 12 contains a fluorescent material. The first light beam S1 of the light beam S emitted by the laser 11 generates the monochromatic fluorescence S3 under the excitation of the fluorescence assembly. The fluorescence S3 and the second light beam S2 of the light beam S converge at the light outlet 15 to form a converged light beam, and the converged light beam is white light and is output from the laser light system.

In summary, in the laser light system according to some embodiments of the present disclosure, the monochromatic fluorescence excited by the fluorescence assembly and the monochromatic laser source can synchronously irradiate to the light outlet and converged to output a white light beam, without arranging light paths for fluorescences of different colors, such that the structure of the light paths is simple. In this way, the problem that the structure of the laser light system in the related art is complex and large since the fluorescences of different colors time-sharing output through different light paths is addressed, such that the effect of miniaturization of the laser light system is achieved, and the luminance of the projected image is improved.

In some embodiments, the fluorescence assembly 14 and the laser 11 are respectively disposed on two opposite sides, in a first direction f2, of the beam combiner 12. The first direction f2 is parallel to the light-emitting direction f1. The reflector group 131 and the light outlet 15 are disposed on two opposite sides, in a second direction f3, of the beam combiner 12. The second direction f3 is not parallel to the first direction f2.

Exemplarily, the second direction f3 is perpendicular to the first direction f2, such that the laser light system is more compact, which facilitates the miniaturization of the laser light system.

With such a structure, the laser, the reflector group in the loop guide assembly, the fluorescence assembly, and the light outlet is arranged around the beam combiner, and thus the structure of the system is compact. The convergence light source generated by the laser light system is also adapted to projection equipment having at least two light valves.

The first region is configured to allow a % of the light beam, irradiating to the lens surface of the first region, to pass through the first region and b % of the light beam to be reflected, wherein a+b≤100.

In some embodiments, the first region is specifically a transmissive-reflective lens. The transmissive-reflective lens is configured to allow a % of the light beam, irradiating to the transmissive-reflective lens, to pass through the transmissive-reflective lens and b % of the light beam to be reflected, wherein a+b≤100. The transmissive-reflective lens includes a transparent base substrate and a semi-transmissive and semi-reflective film arranged on the transparent base substrate.

In some embodiments, the transmissive-reflective lens includes a transparent base substrate and a polarizer arranged on the transparent base substrate.

In some embodiments, the first region includes a transmissive region and a reflective region. The transmissive region is configured to receive the first light beam and the reflective region is configured to receive the second light beam. The transmissive region has a dichroic color select function. Exemplarily, the transmissive region includes a dichroic lens, and the dichroic lens is configured to transmit light of a first color emitted by the laser and to reflect light other than the light of the first color.

In some embodiments, the reflector group in the loop guide assembly includes a first lens group and a first reflector. The first lens group includes a first portion and a second portion that are separated by a first plane. The main optical axis of the first lens group is within the first plane.

The first portion is configured to receive the second light beam reflected by the first region and direct the received second light beam to the first reflector. The second portion is configured to receive the light beam reflected by the first reflector and direct the received light beam to the first region.

In some embodiments, the loop guide assembly includes a second lens group. The second lens group includes a third portion and a fourth portion that are separated by a second plane. The main optical axis of the second lens group is within the second plane;

The third portion is configured to receive the first light beam passing through the first region and direct the received first light beam to the fluorescence assembly. The fluorescence assembly is configured to emit fluorescence upon excitation of the first light beam and reflect the fluorescence to the fourth portion. The fourth portion is configured to direct the received fluorescence to the second region.

In some embodiments, the fluorescence assembly is configured to excite yellow fluorescence, and the laser emits blue laser.

Alternatively, the fluorescence assembly is configured to excite white fluorescence and the laser emits blue laser.

In some embodiments, the reflector assembly includes a triangular prism. The triangular prism includes a side surface, a first surface, and a second surface. The side surface is configured to receive the second light beam reflected by the first region and direct the received second light beam to the first surface. The first surface is configured to reflect the received light beam to the second surface. The second surface is configured to reflect the received light beam to the side surface, and the reflected light beam passes through the side surface and irradiates to the first region.

In some embodiments, the first region and the second region are arranged adjacent to each other and both are arranged at an acute angle with an optical axis of the light beam emitted by the laser. Different functional partitions of the first region and the second region are achieved by a coating on the transparent base substrate.

In some embodiments, different transmittance-to-reflection ratios of the first region are implemented by a coating, such that an amount of the first light beam passing through the first region and an amount of the second light beam reflected by the first region are varied by adjusting the transmittance-to-reflection ratio.

In some embodiments, a first surface of the first region, to which the light beam emitted by the laser is incident, is provided with a coating film, a polarizing film, or a polarizer. A second surface opposite to the first surface, that is, a surface proximal to the fluorescence assembly, is provided with a dichroic film that transmits blue light and reflects light with a wavelength within the fluorescence wavelength range.

In some embodiments, a first surface, facing or proximal to the fluorescence assembly, of the second region has a light reflection function. The second region is a piece of reflector, or the first surface of the second region is coated with a full-reflective film or a reflective film that is to the fluorescence wavelength range.

In some embodiments, the blue laser beam has a narrow beam width, and the fluorescence is dispersed in Lambertian, that is, an area of the light beam of the fluorescence is large and a dispersion angle is large. Therefore, by arranging an area of the first region to be smaller than an area of the second region, the fluorescence is collected as much as possible, which improves the light efficiency. Moreover, an optical axis of the blue laser beam is proximal to an optical axis of the fluorescence as much as possible by adjusting a position where the second light beam is reflected, by the loop guide assembly, towards the first region. In this way, the difficulty in converging the light by subsequent light paths is reduced.

Figure 3:
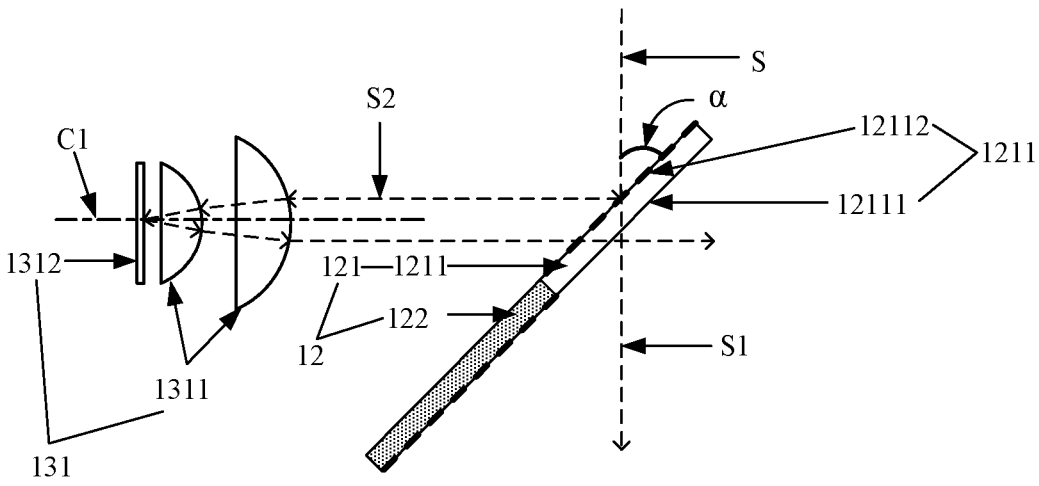
FIG. 3 is a schematic structural diagram of a beam combiner and a reflector group in the laser light system as illustrated in FIG. 2.

FIG. 3 is a schematic structural diagram of the beam combiner 12 and the reflector group 131 in the laser light system as illustrated in FIG. 2. In some embodiments, as illustrated in FIG. 3, the first region 121 includes a transmissive-reflective lens 1211, and the transmissive-reflective lens 1211 is configured to allow a % of the light beam S, irradiating to the transmissive-reflective lens, to pass through the transmissive-reflective lens and b % of the light beam S to be reflected, wherein a+b≤100.

Exemplarily, in the case that a=80 and b=20, that is, 80% of the light beam passes through the transmissive-reflective lens and is incident to the fluorescence assembly, which is configured to excite the fluorescence assembly to generate the monochromatic fluorescence, and 20% of the light beam is reflected to be used as primary color light of the laser, which is converged with the generated monochromatic fluorescence.

The ratio of the a % of the light beam as transmitted to the b % of the light beam as reflected is determined by a color ratio of the red green blue color mode. The color temperature of the light beam varies at different ratios, such as a=80 and b=20 when the color temperature is arranged to be 9000 to 10000 K. The lower color temperature is achieved by increasing the transmitted light and decreasing the reflected light; the higher color temperature is achieved by reducing the transmitted light and increasing the reflected light.

The red green blue color mode is a color standard in the industry. A variety of colors are acquired by changing the red, green, and blue color channels and performing superposition among them. Red, green, and blue are colors that represent colors of three channels of red, green, and blue. The standard includes almost all the colors that human vision can perceive and is one of the most widely used color systems.

The color temperature is a unit of measurement that represents color contents in light. For example, the color temperature of red is the lowest, then the color temperatures of orange, yellow, white, and blue progressively increase, and the color temperature of blue is the highest. The higher the color temperature, the more the blue components in the spectrum, while the red components are less. The light color of the incandescent lamp is warm white, and its color temperature is expressed as 2700K, while the color temperature of the daylight fluorescence lamp is expressed as 6000K.

In some embodiments, as illustrated in FIG. 3, the transmissive-reflective lens 1211 includes a transparent base substrate 12111 and a semi-transmissive and semi-reflective film 12112 arranged on the transparent base substrate 12111.

The transparent base substrate 12111 is a colorless optical glass with high transparency.

The semi-transmissive and semi-reflective film 12112 is a type of the beam splitting film, which is coated on the transparent base substrate 12111. In the case that a light beam is projected onto the transmissive-reflector 1211, the light beam is split into two light beams by reflection and refraction. Therefore, the semi-transmissive and semi-reflective film 12112 is configured to distribute a luminous flux of the incident light to control a split ratio to be a:b. That is, a % of the incident light is transmitted and b % of the incident light is reflected. The luminous flux refers to radiant power of light perceived by human eyes.

Figure 4:
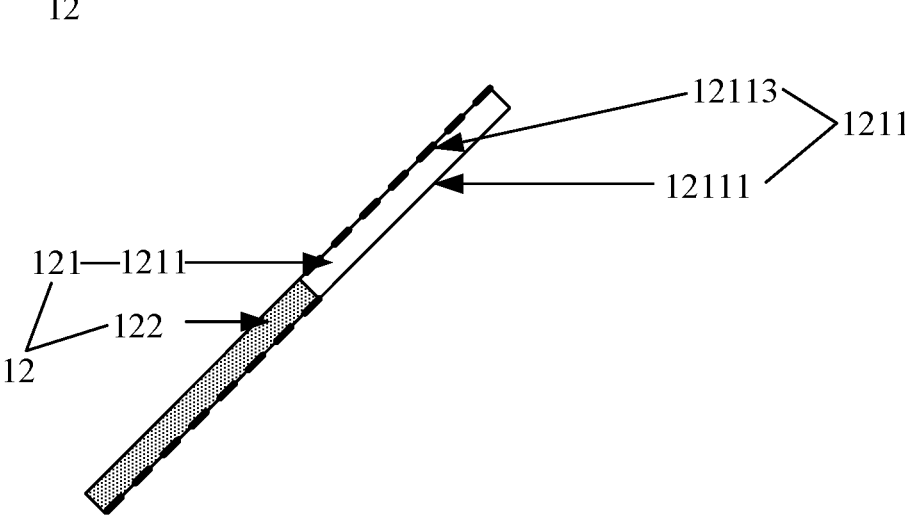
FIG. 4 is a schematic structural diagram of another beam combiner according to some embodiments of the present disclosure.

FIG. 4 is a schematic structural diagram of another beam combiner according to some embodiments of the present disclosure. In some embodiments, as illustrated in FIG. 4, the transmissive-reflective lens 1211 includes the transparent base substrate 12111 and a polarizer 12113 arranged on the transparent base substrate 12111. The polarizer 12113 is an optical filter, in which the transmittance of light is directly related to a polarization direction of the light. The polarizer 12113 allows polarized light in a certain direction to pass, while light, of which a polarization direction is perpendicular to the certain direction, is reflected into other directions. That is, a % of the laser is transmitted and b % of the laser is reflected, and thus the color temperature of the convergence light beam incident to the light outlet is adjusted.

Polarization is the asymmetry of the vibration direction with respect to the transmission direction, which is one of the most obvious signs that transverse waves are different from other longitudinal waves, and only the transverse waves have polarization. Light waves are electromagnetic waves, and thus the transmission direction of light waves is the transmission direction of electromagnetic waves. The vibration direction of light waves is perpendicular to the transmission direction, and thus light waves are transverse waves, which have polarization. The light with polarization is referred to as polarized light.

Laser is polarized. In the case that a light beam emitted by a laser irradiates to a polarizer, a certain angle is present between a polarization direction of the laser and a polarization direction of the polarizer. In the case that the angle is predefined, a % of the laser is transmitted and b % of the laser is reflected. Exemplarily, in the case that the predetermined angle is 45 degrees, 50% of the laser is transmitted and 50% of the laser is reflected.

The light valve is a digital micromirror device (DMD), and the DMD includes a rectangular functional region. The polarization direction of the laser is parallel or perpendicular to a long axis direction of the functional region.

Figure 5:
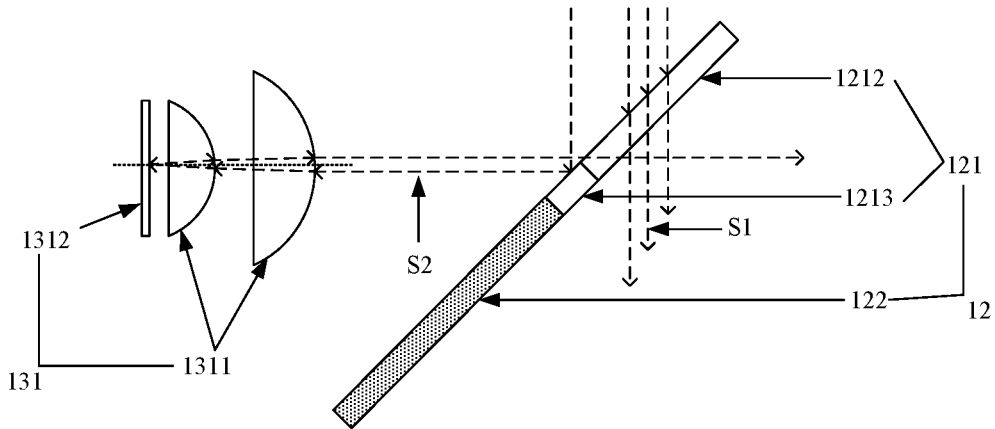
FIG. 5 is a schematic structural diagram of another beam combiner and another reflector group according to some embodiments of the present disclosure.

FIG. 5 is a schematic structural diagram of another beam combiner 12 and another reflector group 131 according to some embodiments of the present disclosure. In some embodiments, as illustrated in FIG. 5, the first region 121 includes a transmissive region 1212 and a reflective region 1213. The transmissive region 1212 is configured to receive the first light beam S1 and the reflective region 1213 is configured to receive the second light beam S2. The ratio of lengths of the transmissive region 1212 and the reflective region 1213 is a:b. That is, the light beam emitted by the laser includes the first light beam S1 and the second light beam S2, and the ratio of the first light beam S1 passing through the transmissive region 1212 to the reflected light beam S2 is a:b. In this way, the color temperature of the convergence light beam incident to the light outlet is adjusted.

In some embodiments, the transmissive region 1212 includes a dichroic lens configured to transmit light of a first color emitted by the laser and reflect light other than the light of the first color. By arranging the dichroic lens, the fluorescence excited by the fluorescence assembly is prevented from passing through the transmissive region to be incident to the laser, which reduces damage to the laser while improving the reflection effect of the fluorescence on the beam combiner.

Figure 6:
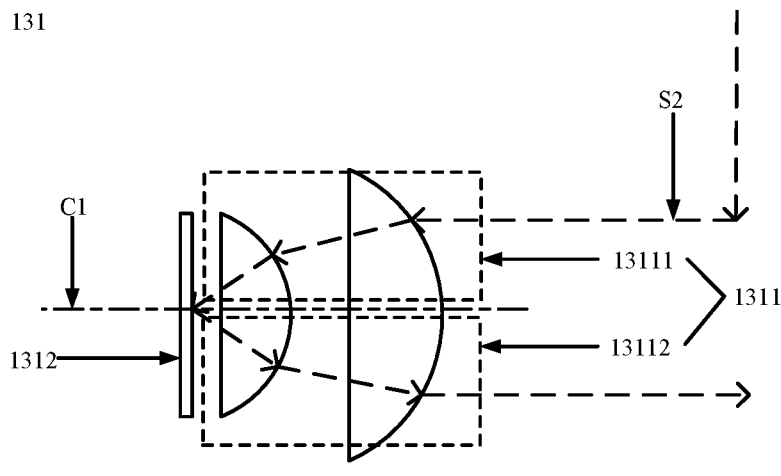
FIG. 6 is a schematic structural diagram of a reflector group in the laser light system as illustrated in FIG. 2.

FIG. 6 is a schematic structural diagram of a reflector group 131 in the laser light system as illustrated in FIG. 2. In some embodiments, referring to FIG. 6, the reflector group 131 includes a first lens group 1311 and a first reflector 1312. The first lens group 1311 includes a first portion 13111 and a second portion 13112 that are separated by a first plane. A main optical axis C1 of the first lens group 1311 is within the first plane. The first lens group 1311 includes two convex lenses.

The first portion 13111 is configured to receive the second light beam S2 reflected by the first region and direct the received second light beam S2 to the first reflector 1312. The second portion 13112 is configured to receive a light beam reflected by the first reflector 1312 and direct the received light beam to the first region.

A light path of the second light beam S2 prior to entering the reflector group 131 and a light path of the second light beam S2 upon being reflected by the reflector group 131 are separated by arranging the first lens group 1311, such that the incident light path of the second light beam S2 and the reflected light path of the second light beam S2 are not the same light path, and thus the reflected light beam S2 is prevented from returning to the laser along the incident light path and causing damage to the laser.

In the above light paths, the second light beam reflected by the first region is incident to the first lens group 1311 and does not pass through the optical axis of the first lens group 1311. That is, the second light beam is incident to the first lens group 1311 offsetting the axis. The first reflective lens 1312 receives and reflects the second light beam which is converged by the first lens group 1311, and the second light beam is incident to the first region upon passing through the first lens group 1311 again. In this case, a position at which the second light beam is incident to the first region is completely not overlapped with a position at which the second light beam is reflected by the first region. During the implementation, the two positions do not overlap, and thus the second light beam passes through the first region through a new position.

In some embodiments, as illustrated in FIG. 2, the loop guide assembly 13 includes a second lens group 132, wherein the second lens group 132 includes two convex lenses.

Figure 7:
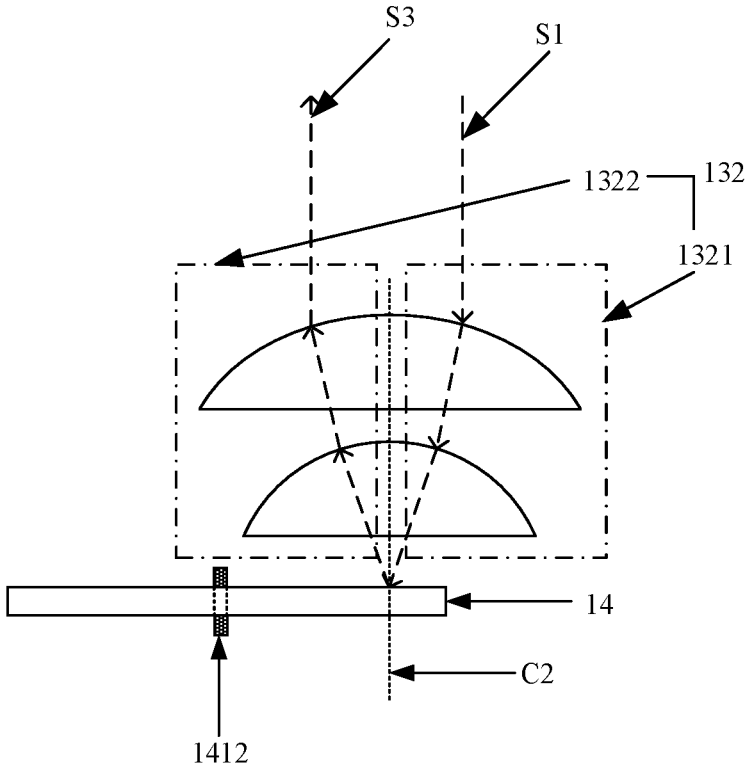
FIG. 7 is a schematic structural diagram of a second lens group and a fluorescence assembly in the laser light system as illustrated in FIG. 2.

FIG. 7 is a schematic structural diagram of a second lens group 132 and a fluorescence assembly 14 in the laser light system as illustrated in FIG. 2. In some embodiments, as illustrated in FIG. 7, the second lens group 132 includes a third portion 1321 and a fourth portion 1322 that are separated by a second plane. A main optical axis C2 of the second lens group 132 is within the second plane.

The third portion 1321 is configured to receive the first light beam S1 passing through the first region and direct the received first light beam S1 to the fluorescence assembly 14. The fluorescence assembly 14 is configured to emit fluorescence S3 upon excitation of the first light beam S1 and reflects the fluorescence S3 to the fourth portion 1322. The fourth portion 1322 is configured to direct the received fluorescence S3 to the second region.

A light path of the first light beam S1 and a light path of the fluorescence S3 are separated by arranging the second lens group 132, such that the first light beam S1 and the fluorescence S3 are not in the same light path, and thus the fluorescence S3 is prevented from being incident into the laser along the light path of the first light beam S1 and causing damage to the laser.

In some embodiments, the fluorescence assembly is configured to excite yellow fluorescence and the laser emits blue laser. The yellow fluorescence excited by the fluorescence assembly and a partial light beam of the blue laser emitted by the laser are converged at the light outlet to produce a white light beam. In the case that a color temperature of the white beam produced by the partial light beam of the blue laser and the yellow fluorescence does not meet the requirement of the color temperature ratio, an additional blue laser is added.

Alternatively, the fluorescence assembly is configured to excite white fluorescence and the laser emits blue laser. The white fluorescence excited by the fluorescence assembly and a partial light beam of the blue laser emitted by the laser are converged at the light outlet to produce a white light beam. The partial light beam of the blue laser is configured to adjust a color temperature.

Figure 8:
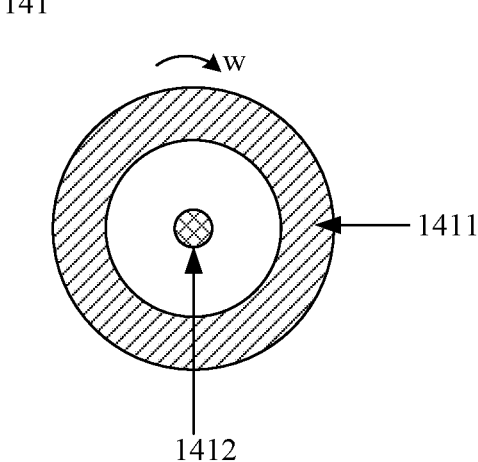
FIG. 8 is a schematic structural diagram of a fluorescence assembly in the laser light system as illustrated in FIG. 2.

FIG. 8 is a schematic structural diagram of a fluorescence assembly in the laser light system. As illustrated in FIG. 8, the fluorescence assembly includes a fluorescence wheel 141, and the fluorescence wheel 141 includes a fluorescence ring 1411 and a rotation shaft 1412. The rotation shaft 1412 is connected to the fluorescence ring 1411 through the fluorescence ring 1411. In the use of the fluorescence wheel 141, the rotation shaft 1412 is rotated along a rotation direction w, and thus the fluorescence ring 1411 is caused to rotate to dissipate heat while continuously being excited to emit fluorescence. In this way, a light saturation phenomenon of a fluorescent material caused by high power of the excitation light of the fluorescence ring 1411 is avoided, and meanwhile, the fluorescence ring 1411 is prevented from generating excessive heat under the irradiation of the laser to cause damage to the fluorescence ring 1411, which improves the light efficiency and reliability of the fluorescent material. A side, proximal to the beam combiner, of the fluorescence ring 1411 is provided with white phosphor or yellow phosphor. The side, proximal to the beam combiner, of the fluorescence ring 1411 is a fluorescence ceramic structure, which is excited to produce white or yellow fluorescence.

The light saturation phenomenon refers to a phenomenon when the intensity of light increases to a certain value, the photosynthetic rate no longer increases accordingly as the intensity of light increases again.

Figure 9:
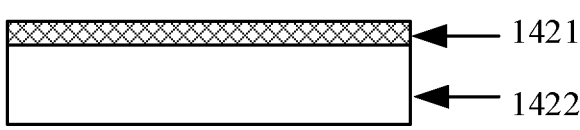
FIG. 9 is a schematic structural diagram of another fluorescence assembly according to some embodiments of the present disclosure.

FIG. 9 is a schematic structural diagram of another fluorescence assembly according to some embodiments of the present disclosure. As illustrated in FIG. 9, the fluorescence assembly includes a fixed fluorescence sheet 142, and the fixed fluorescence sheet 142 includes a fluorescence sheet 1421 and a metal base 1422.

The fluorescence sheet 1421 is arranged on a side, proximal to the beam combiner, of the metal base 1422. The fluorescence sheet 1421 and the metal base 1422 are connected by welding, and the metal base 1422 is provided with a radiator, which is a finned radiator, that is, the metal base 1422 is provided with fins to enhance heat transfer. In this way, the fluorescence sheet 1421 is prevented from generating excessive heat under the irradiation of the laser to cause damage to the fluorescence sheet 1421.

Figures 10, 11:
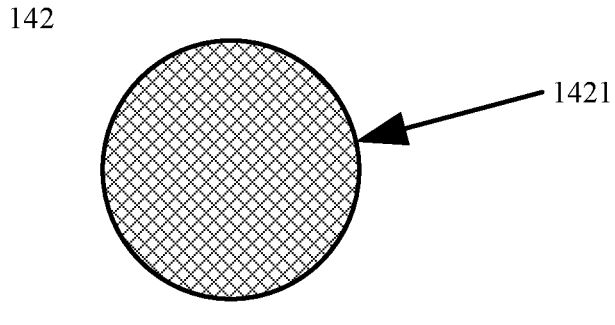
FIG. 10 is a top view of a fixed fluorescence sheet as illustrated in FIG. 9.
FIG. 11 is a schematic structural diagram of another reflector group according to some embodiments of the present disclosure.

FIG. 10 is a top view of a fixed fluorescence sheet 142 as illustrated in FIG. 9. As illustrated in FIG. 10, a side, proximal to the beam combiner, of the fluorescence sheet 1421 is provided with white phosphor or yellow phosphor.

FIG. 11 is a schematic structural diagram of another reflector group according to some embodiments of the present disclosure. In some embodiments, as illustrated in FIG. 11, the reflector group includes a triangular prism 1313, and the triangular prism includes a side surface 13131, a first surface 13132, and a second surface 13133.

The side surface 13131 is configured to receive the second light beam S2 reflected by the first region and direct the received second light beam S2 to the first surface 13132. The first surface 13132 is configured to reflect the received light beam to the second surface 13133. The second surface 13133 is configured to reflect the received light beam to the side surface 13131, and the reflected light beam passes through the side surface 13131 and irradiates to the first region.

The triangular prism 1313 separates a light path of the second light beam S2 prior to entering the triangular prism 1313 from a light path of the second light beam S2 upon being reflected by the triangular prism 1313, such that the incident light path of the second light beam S2 and the reflected light path are not the same light path, and thus the reflected light beam S2 is prevented from returning to the laser along the incident light path and causing damage to the laser.

As illustrated in FIG. 2, a lens 151 and a diffusor assembly 152 are arranged at the light outlet 15. The lens 151 is configured to converge the fluorescence and second light beam that projected to the light outlet 15 and allow the converged light to be irradiated to the diffusor assembly 152. The diffusor assembly 152 includes a light tube. The light tube is a tubular device spliced by four planar reflective sheets, that is, a hollow light tube. The light is reflected inside the light tube several times to achieve the effect of homogenizing the light. In some embodiments, the light tube is a solid light tube. A light inlet and a light outlet of the light tube are rectangles with the same shape and area. The light beam enters from the light inlet of the light tube and then irradiates from the light outlet to the light valve assembly, and the beam homogenization and light spot optimization are completed in the process that the light passes through the light tube.

Beam homogenization refers to shaping a beam, of which a distribution of intensity is uneven, into a beam, of which a distribution of cross sections is uniform, by beam transformation. When a laser light source illuminates, for example, a rough surface of a screen or any other object that produces diffuse reflection or diffuse transmission, it generates light beams. The interference of the light beams forms bright spots or dark spots, producing random grain intensity patterns, and the random grain intensity patterns are the light spots.

In some embodiments, the diffusor assembly 152 is a fly-eye lens. The fly-eye lens is typically formed by combining a series of small lenses. A light spot of the input laser beam is split by arranging two arrays of fly-eye lenses in parallel, and the split spots are accumulated by subsequent focus lenses, such that the effects of beam homogenization and light spot optimization are achieved.

In summary, some embodiments of the present disclosure provide the laser light system including the laser, the beam combiner, the loop guide assembly, the fluorescence assembly, and the light outlet. In the laser light system, the monochromatic fluorescence excited by the fluorescence assembly and the monochromatic laser source can synchronously irradiate to the light outlet and converged to output a white light beam, without arranging light paths for fluorescences of different colors, such that the structure of the light paths is simple. In this way, the problem that the structure of the laser light system in the related art is complex and large due to the fact that the fluorescences of different colors time-sharing output through different light paths is addressed, such that the effect of miniaturization of the laser light system is achieved.

In addition, the laser, the reflector group in the loop guide assembly, the fluorescence assembly, and the light outlet is arranged surrounding the beam combiner, and thus the structure of the system is compact. The convergence light source generated by the laser light system is also adapted to projection equipment having at least two light valves.

Figure 12:
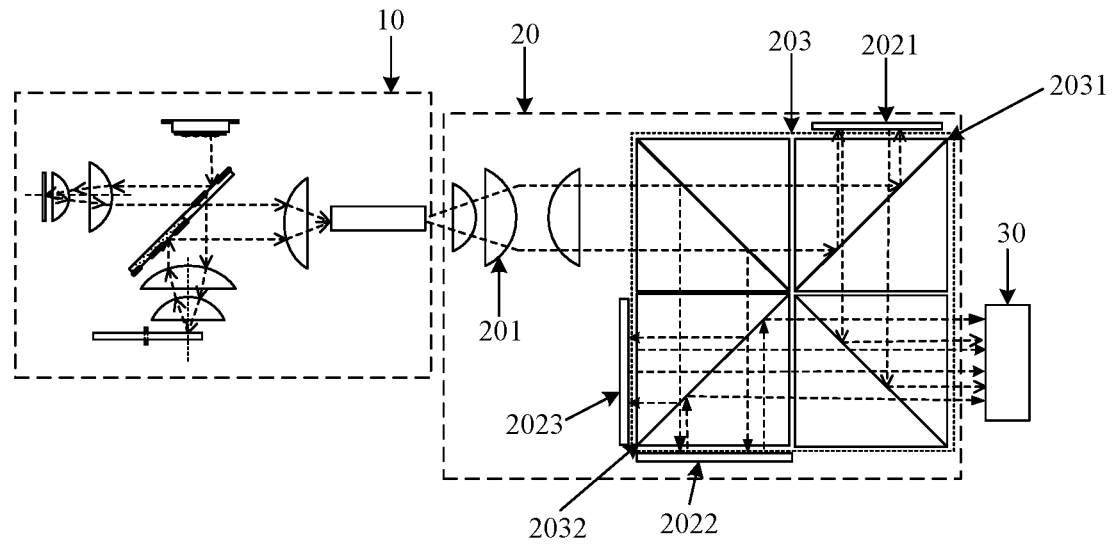
FIG. 12 is a schematic structural diagram of projection equipment according to some embodiments of the present disclosure.

FIG. 12 is a schematic structural diagram of projection equipment according to some embodiments of the present disclosure. As illustrated in FIG. 12, the projection equipment includes a laser light system 10, an optical machine illumination system 20, and a projection lens 30. The optical machine illumination system includes a lens group 201, a light valve assembly, and a prism group 203. The laser light system 10 emits a light beam to the optical machine illumination system 20, and the light beam enters the light valve assembly upon being adjusted by the lens group 201 and the prism group 203. The light valve assembly emits an image beam upon modulating the light beam. The image beam enters the projection lens 30 upon passing through the prism group 203, and then exits from the laser projection equipment by the projection lens 30.

In some embodiments, the prism group 203 includes four prisms (which are respectively disposed on the upper-left, upper-right, lower-left, and lower-right corners of FIG. 12). Each of the prisms includes two triangular prisms arranged opposite to each other. The prism in the lower-left corner and the prism in the upper-right corner are a polarization beam splitter (PBS) 2031 and a PBS 2032. The PBS is capable of dividing the incident unpolarized light into two perpendicular beams of linearly polarized light.

In some embodiments, for the laser light system 10 in the projection equipment, reference is made to the laser light system according to the above embodiments. The laser light system 10 in the projection equipment includes a laser, a beam combiner, a loop guide assembly, a fluorescence assembly, and a light outlet. A portion of a light beam emitted from the laser is excited by the fluorescence assembly to generate fluorescence. The fluorescence and another portion of the light beam emitted by the laser synchronously irradiate to the light outlet and converged at the light outlet to generate a white light beam.

The light valve assembly in the projection equipment includes at least two light valves and the laser light system in the above embodiments. In the case that the projection equipment includes two light valves, the two light valves are respectively configured to process the fluorescence and the laser that are provided by the laser light system. FIG. 12 illustrates a scenario where the projection equipment includes three light valves.

In some embodiments, the number of light valves is three, and the three light valves (2021, 2022, 2023) are respectively configured to process three colored light in the white light provided by the laser light system. That is, the light valve assembly includes the light valve 2021, the light valve 2022, and the light valve 2023, respectively configured to process multi-primary color light provided by the laser light system.

The light valve includes a digital micromirror element, a liquid crystal on silicon (LCOS) chip, or a liquid crystal display device (LCD) chip.

Exemplarily, the light valve assembly includes three LCDs. The LCD is a liquid crystal display micro-device that controls the transmittance and reflectance of liquid crystal units, by circuits based on an electro-optical effect of the liquid crystal, to produce images of different grayscales and colors.

The 3LCD projector uses three LCDs, red, green, and blue LCDs, as control layers of red, green, and blue light respectively. The white light emitted by the laser light system is converged at the dichroic lens group upon passing through the lens groups. The red light is first separated and projected onto the red LCD, and red light information of the image is formed on the red LCD. The green light is projected onto the green LCD to form green light information of the image. Similarly, blue light information of the image is generated after the blue light is projected onto the blue LCD. The light of three colors is converged in the prism group and projected onto a projection screen by the projection lens to form a full-color image.

In summary, some embodiments of the present disclosure provide projection equipment having at least two light valves and a laser light system. In the laser light system, the monochromatic fluorescence excited by the fluorescence assembly and the monochromatic laser source can synchronously irradiate to the light outlet and converged to output a white light beam, without arranging light paths for fluorescences of different colors, such that the structure of the light paths is simple. In this way, the problem that the structure of the laser light system in the related art is complex and large due to the fact that the fluorescences of different colors time-sharing output through different light paths is addressed, such that the effect of miniaturization of the laser light system is achieved. The convergence light source generated by the laser light system is also adapted to projection equipment with at least two light valves, which improves the projection performance of the projection equipment.

In the present disclosure, the terms "first" and "second" are only used for descriptive purposes, and cannot be understood as indicating or implying relative importance. The term "a plurality of" refers to two or more, unless expressly defined otherwise.

Described above are merely exemplary embodiments of the present disclosure, and are not intended to limit the present disclosure. Therefore, any modifications, equivalent substitutions, improvements, and the like made within the spirit and principles of the present disclosure shall be included in the protection scope of the present disclosure.

What is claimed is:

1. A laser optical system, comprising: a laser, a beam combiner, a loop guide assembly, and a fluorescence assembly; wherein the beam combiner comprises a first region and a second region, and an angle between a light-emitting direction of the laser and a lens surface of the first region is an acute angle;

a light beam emitted by the laser comprises a first light beam passing through the first region and irradiating to the fluorescence assembly, wherein the fluorescence assembly generates a fluorescence upon excitation of the first light beam, and the fluorescence is reflected to the second region by the fluorescence assembly, and is further reflected into a direction towards a light outlet by the second region; and the light beam emitted by the laser further comprises a second light beam reflected to the loop guide assembly by the first region, wherein the second light beam is further reflected to the first region by the loop guide assembly, passes through the first region, and irradiates to the direction towards the light outlet in synchronization with the fluorescence;

wherein the fluorescence and the second light beam converge at the light outlet to form white light; and the loop guide assembly comprises a first lens group and a first reflector; wherein the second light beam reflected by the first region is incident to the first lens group and does not pass through an optical axis of the first lens group;

the first reflector receives and reflects the second light beam converged by the first lens group, and the second light beam is incident to the first region upon passing through the first lens group again; and a position at which the second light beam is incident to the first region is not completely overlapped with a position at which the first region reflects the second light beam.

2. The laser light system according to claim 1, wherein the first region is configured to allow a % of the light beam, irradiating to a surface of the first region, to pass through the first region, and b % of the light beam to be reflected, wherein a+b≤100.

3. The laser light system according to claim 2, wherein the first region comprises a transparent base substrate and a semi-transmissive and semi-reflective film arranged on the transparent base substrate.

4. The laser light system according to claim 2, wherein the first region comprises a transparent base substrate and a polarizer arranged on the transparent base substrate.

5. The laser light system according to claim 1, wherein the first region comprises a transmissive region configured to receive the first light beam and a reflective region configured to receive the second light beam, wherein the transmissive region is adjacent to the reflective region.

6. The laser light system according to claim 5, wherein the transmissive region comprises a dichroic lens configured to transmit light of a first color in the light beam emitted by the laser and reflect light other than the light of the first color.

7. The laser light system according to claim 1, wherein the first region and the second region are arranged adjacently and are both arranged at an acute angle with an optical axis of the light beam emitted by the laser.

8. The laser light system according to claim 1, wherein an area of the first region is less than an area of the second region.

9. The laser light system according to claim 1, wherein
the fluorescence assembly is configured to excite yellow fluorescence, and the laser emits blue laser; or
the fluorescence assembly is configured to excite white fluorescence, and the laser emits blue laser.

10. The laser light system according to claim 1, wherein a convergent lens and a light-collection assembly are arranged in the direction towards the light outlet, the convergent lens being configured to converge the second light beam transmitted by the first region and the fluorescence reflected by the second region and cause the converged light to be incident to the light-collecting assembly.

11. Projection equipment, comprising at least two light valves and a laser light system; wherein the laser optical path system comprises a laser, a beam combiner, a loop guide assembly, and a fluorescence assembly; wherein the beam combiner comprises a first region and a second region, and an angle between a light-emitting direction of the laser and a lens surface of the first region is an acute angle;

a light beam emitted by the laser comprises a first light beam passing through the first region and irradiating to the fluorescence assembly, wherein the fluorescence assembly generates a fluorescence upon excitation of the first light beam, and the fluorescence is reflected to the second region by the fluorescence assembly, and is further reflected into a direction towards a light outlet by the second region; and the light beam emitted by the laser further comprises a second light beam reflected to the loop guide assembly by the first region, wherein the second light beam is further reflected to the first region by the loop guide assembly, passes through the first region, and irradiates to the direction towards the light outlet in synchronization with the fluorescence;

wherein the fluorescence and the second light beam converge at the light outlet to form white light; and the loop guide assembly comprises a first lens group and a first reflector; wherein the second light beam reflected by the first region is incident to the first lens group and does not pass through an optical axis of the first lens group;

the first reflector receives and reflects the second light beam converged by the first lens group, and the second light beam is incident to the first region upon passing through the first lens group again; and a position at which the second light beam is incident to the first region is not completely overlapped with a position at which the first region reflects the second light beam.

12. The projection equipment according to claim 11, wherein the number of the light valves is three, the three light valves being configured to process multi-primary color light provided by the laser light system.

13. The projection equipment according to claim 11, wherein the first region is configured to allow a % of the light beam, irradiating to the lens surface of the first region, to pass through the first region, and b % of the light beam to be reflected, wherein a+b≤100.

14. The projection equipment according to claim 11, wherein the first region comprises a transmissive region configured to receive the first light beam and a reflective region configured to receive the second light beam, wherein the transmissive region is adjacent to the reflective region.

15. The projection equipment according to claim 11, wherein the first region and the second region are arranged adjacently and are both arranged at an acute angle with an optical axis of the light beam emitted by the laser.

16. The projection equipment according to claim 11, wherein a convergent lens and a light-collection assembly are arranged in the direction towards the light outlet, the convergent lens being configured to converge the second light beam transmitted by the first region and the fluorescence reflected by the second region and cause the converged light to be incident to the light-collecting assembly.

17. A laser optical system, comprising: a laser, a beam combiner, a loop guide assembly, and a fluorescence assembly; wherein the beam combiner comprises a first region and a second region, and an angle between a light-emitting direction of the laser and a lens surface of the first region is an acute angle;

a light beam emitted by the laser comprises a first light beam passing through the first region and irradiating to the fluorescence assembly, wherein the fluorescence assembly generates a fluorescence upon excitation of the first light beam, and the fluorescence is reflected to the second region by the fluorescence assembly, and is further reflected into a direction towards a light outlet by the second region; and the light beam emitted by the laser further comprises a second light beam reflected to the loop guide assembly by the first region, wherein the second light beam is further reflected to the first region by the loop guide assembly, passes through the first region, and irradiates to the direction towards the light outlet in synchronization with the fluorescence;

wherein the fluorescence and the second light beam converge at the light outlet to form white light; and the loop guide assembly comprises a triangular prism, the triangular prism comprising a side surface, a first surface, and a second surface; wherein the side surface is configured to receive the second light beam reflected by the first region and direct the second light beam to the first surface, the first surface is configured to reflect the received second light beam to the second surface, and the second surface is configured to reflect the received second light beam to the side surface, wherein the reflected second light beam passes through the side surface and irradiates to the first region.

\* \* \* \* \*